United States Patent [19]

Armstrong et al.

[11] 4,355,588
[45] Oct. 26, 1982

[54] TRANSPLANTING MACHINE

[75] Inventors: Errol C. Armstrong; Javier Diaz-Infante; David J. Hall, all of Salinas, Calif.

[73] Assignee: Bud Antle, Inc., Salinas, Calif.

[21] Appl. No.: 150,486

[22] Filed: May 16, 1980

[51] Int. Cl.³ .............................................. A01C 11/02
[52] U.S. Cl. ...................................................... 111/3
[58] Field of Search ........................................ 111/2, 3

[56] References Cited

U.S. PATENT DOCUMENTS

| 570,905 | 11/1896 | Cheeseman | 111/3 |
| 1,026,492 | 5/1912 | Bruhn | 111/3 |
| 1,073,702 | 9/1913 | Owens | 111/3 |
| 1,888,143 | 11/1932 | Poll | 111/3 |
| 2,887,075 | 5/1959 | Linkogel | 111/3 |
| 3,023,717 | 3/1962 | Cline | 111/81 |
| 3,128,833 | 4/1964 | Johnson et al. | 172/245 |
| 3,456,607 | 7/1969 | West | 111/85 |
| 3,906,875 | 9/1975 | Kesinger et al. | 111/2 |
| 4,091,751 | 5/1978 | Dri et al. | 111/2 |
| 4,215,513 | 8/1980 | Dedolph | 47/56 |

FOREIGN PATENT DOCUMENTS

| 468367 | 11/1928 | Fed. Rep. of Germany | 111/3 |
| 829241 | 1/1952 | Fed. Rep. of Germany | 111/3 |
| 2013629 | 10/1971 | Fed. Rep. of Germany | 111/2 |
| 2638846 | 3/1977 | Fed. Rep. of Germany | 111/2 |
| 2854923 | 7/1979 | Fed. Rep. of Germany | 111/2 |
| 1091998 | 4/1955 | France | 111/2 |
| 1136675 | 5/1957 | France | 111/2 |
| 112199 | 4/1975 | German Democratic Rep. | 111/3 |
| 627358 | 8/1949 | United Kingdom | 111/3 |
| 496008 | 2/1976 | U.S.S.R. | 111/2 |

Primary Examiner—James R. Feyrer
Attorney, Agent, or Firm—Townsend and Townsend

[57] ABSTRACT

A machine for transplanting soil plugs with great uniformity and a minimum of manual labor comprising a conveyor having a plurality of soil plug gripping mechanisms mounted thereto, a furrow opening device, and a furrow closing device. The furrow closing device of the present invention is preferably defined by portions of a bed shaper that operates to form the soil into a trapezoidal planting bed. In addition to the normal function of shaping the bed, the bed shaper establishes a ground level with respect to which the plugs are planted, while the rear portions of the bed shaper act to close the furrow, and include adjustable tabs that may be set to control the timing of the closure relative to the plug positioning. Each plug gripping assembly preferably comprises a center opening clip having opposed resilient fingers. The conveyor path is characterized by a lower horizontal path portion that maintains the plugs at the proper planting depth for a significant interval so that the soil may be properly closed around the plugs before the plugs are released.

12 Claims, 17 Drawing Figures

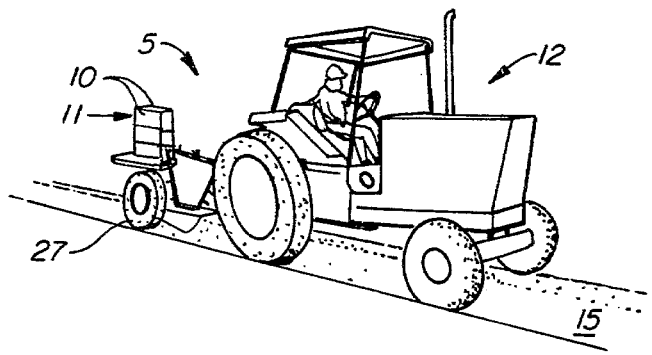
FIG._1.
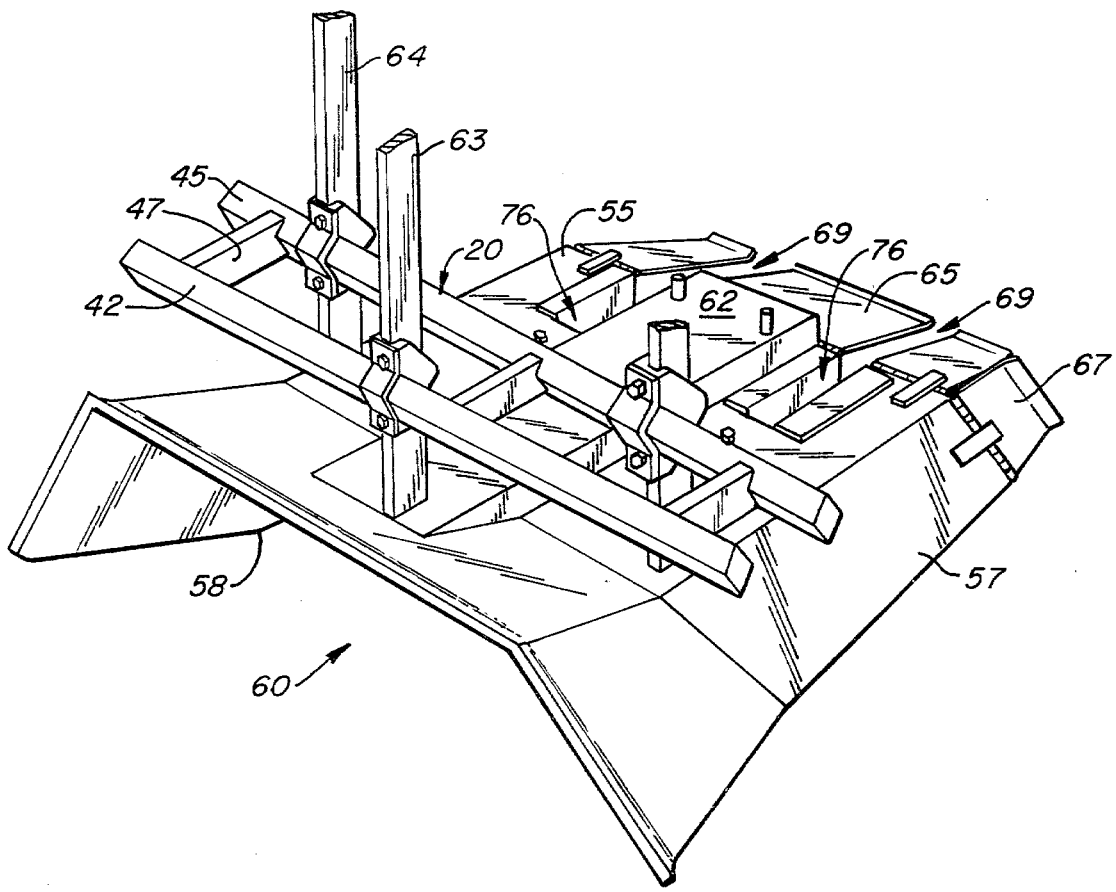
FIG._3.

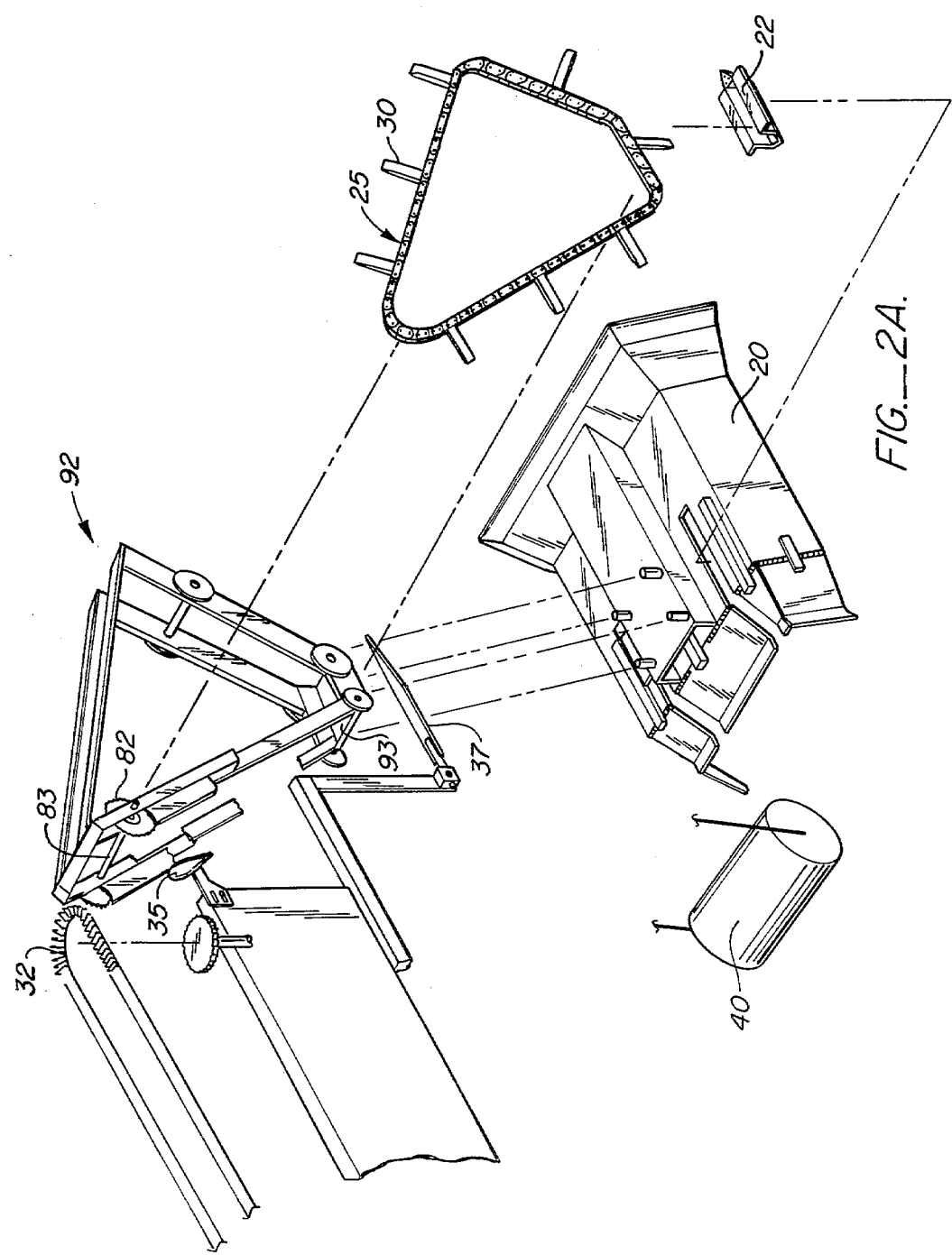
FIG._2A.

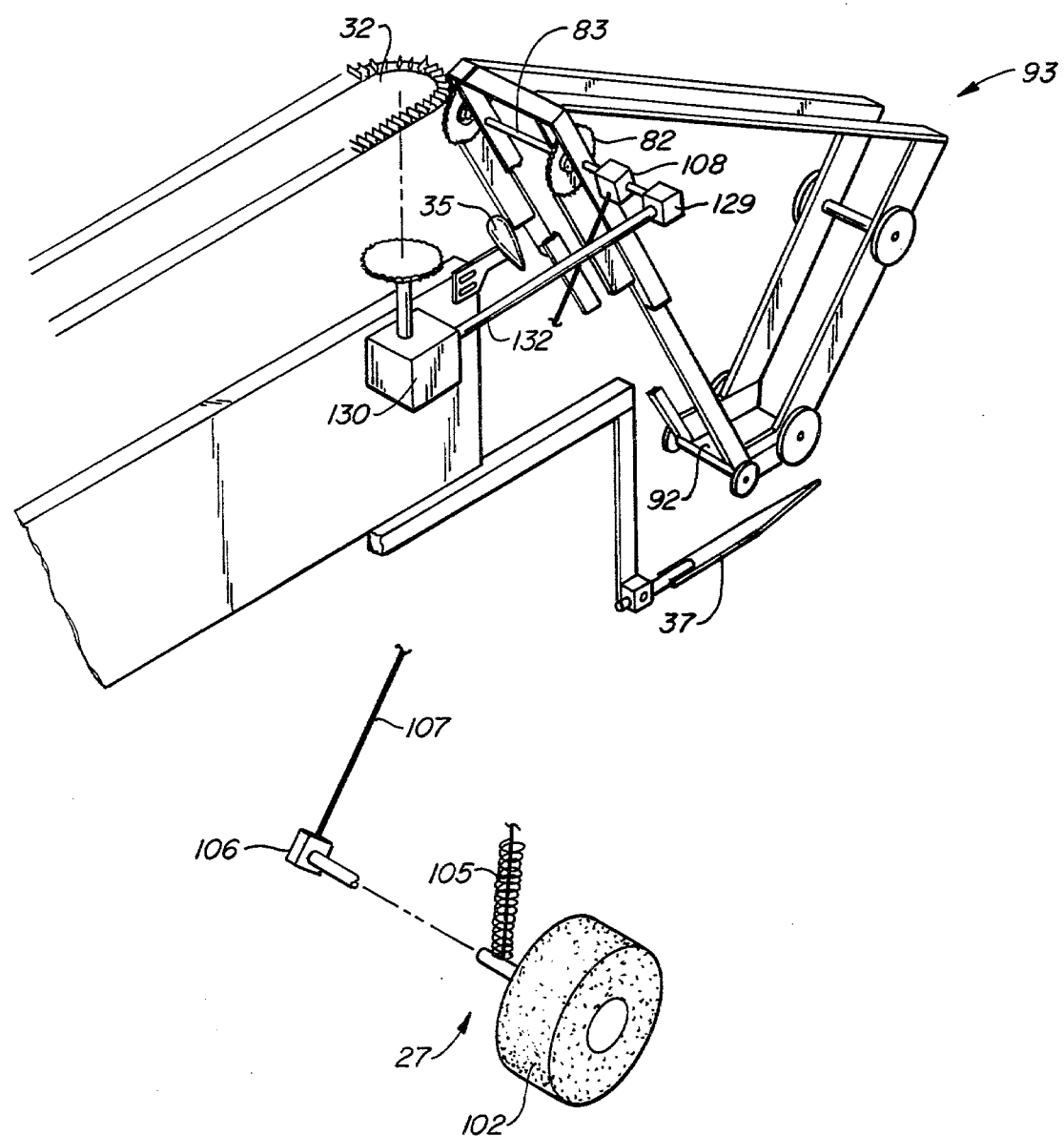
FIG._2B.

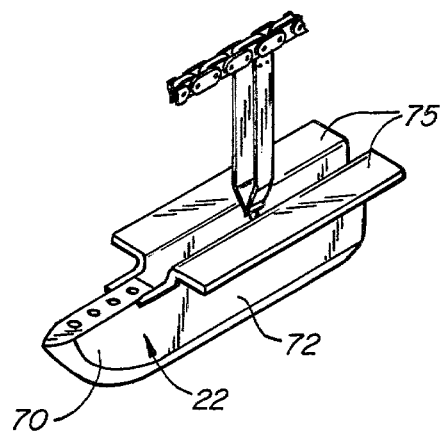
FIG._4.
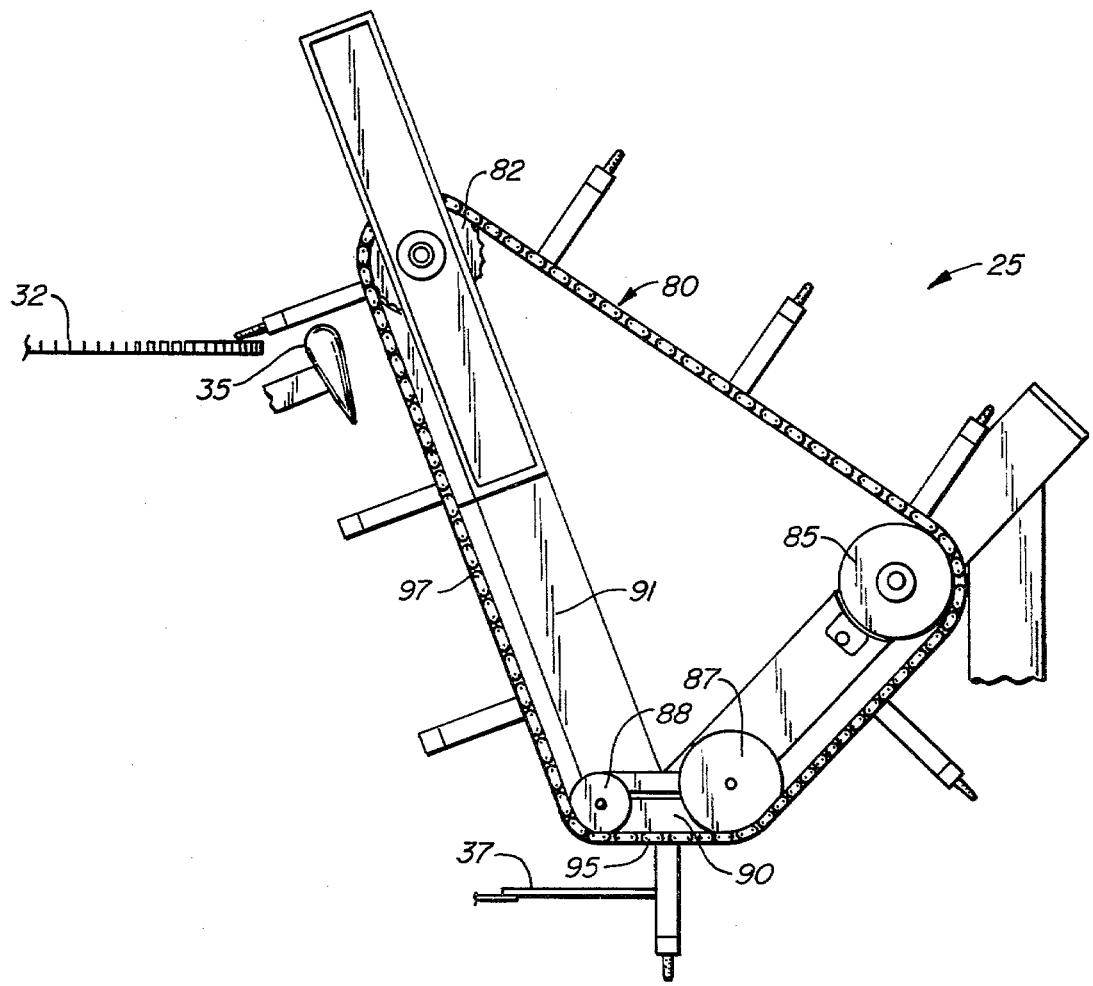
FIG._5.

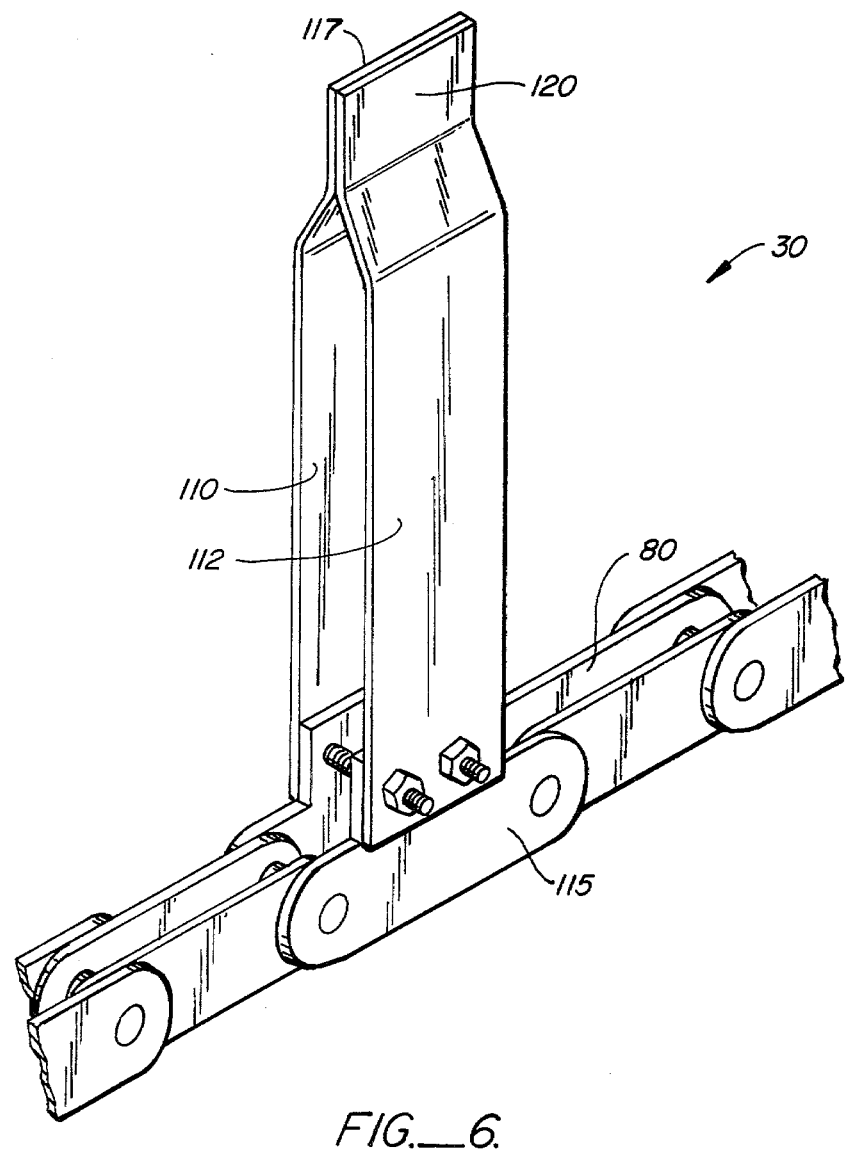
FIG._6.

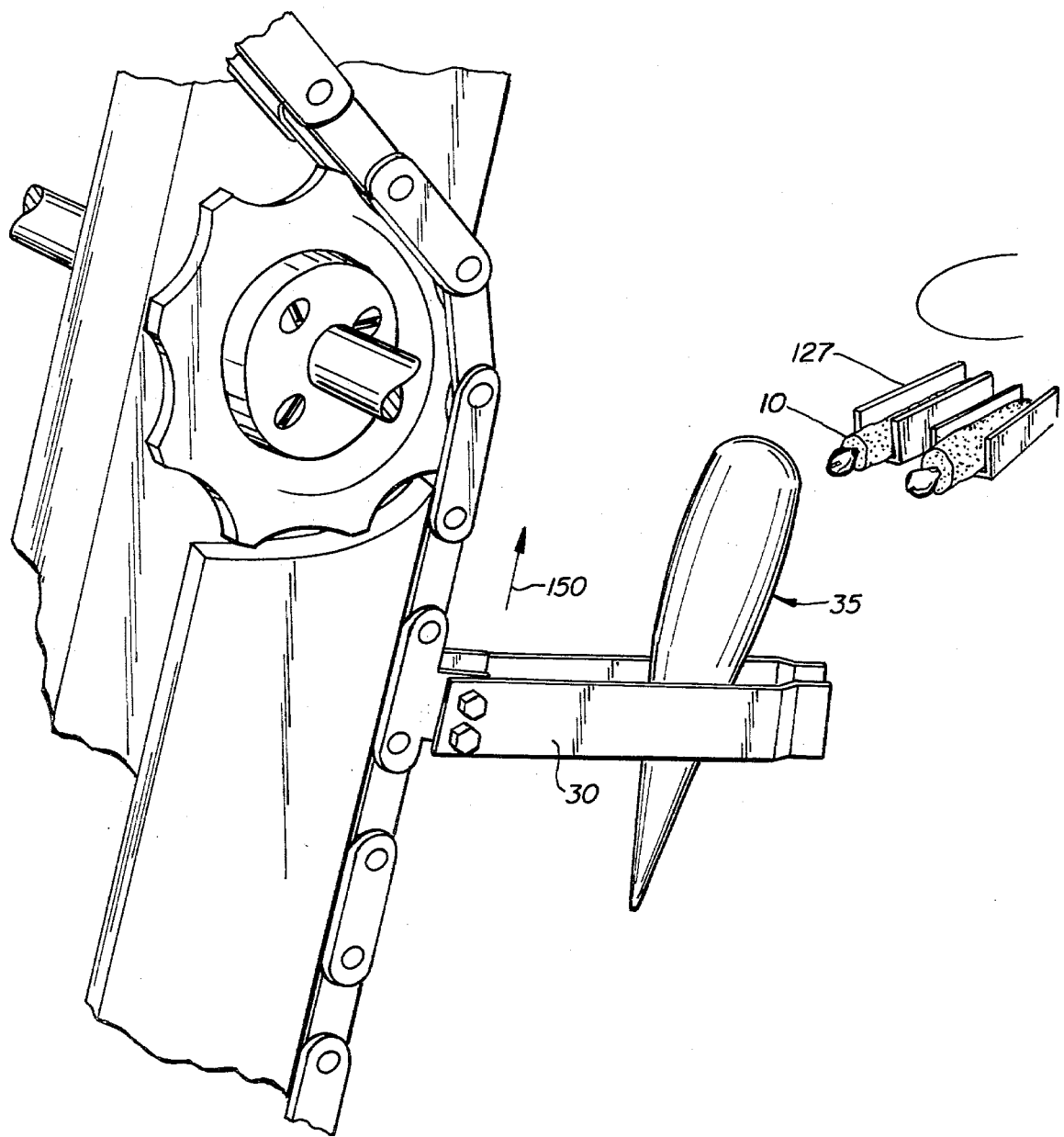
FIG._7A.

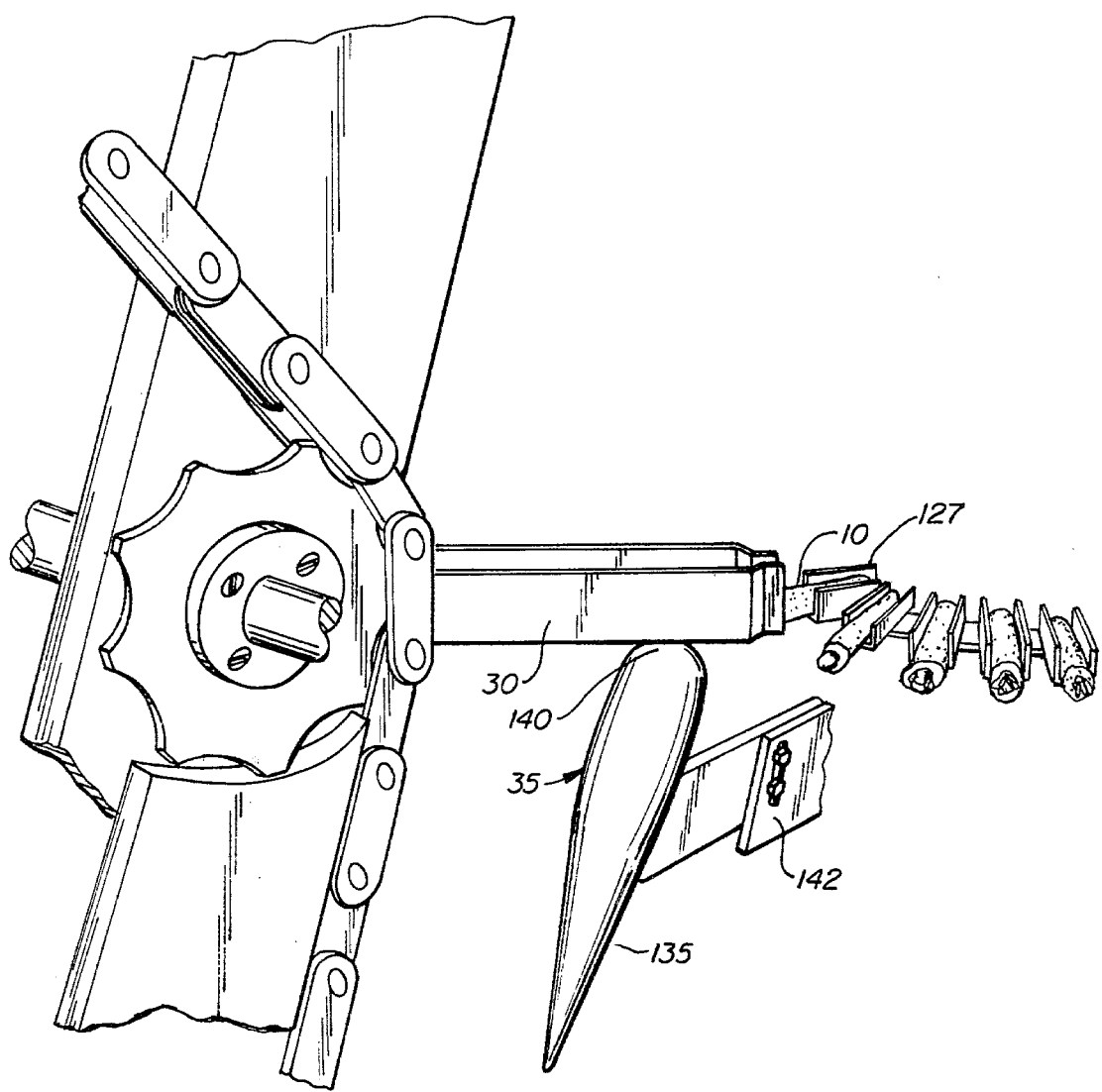
FIG._7B.

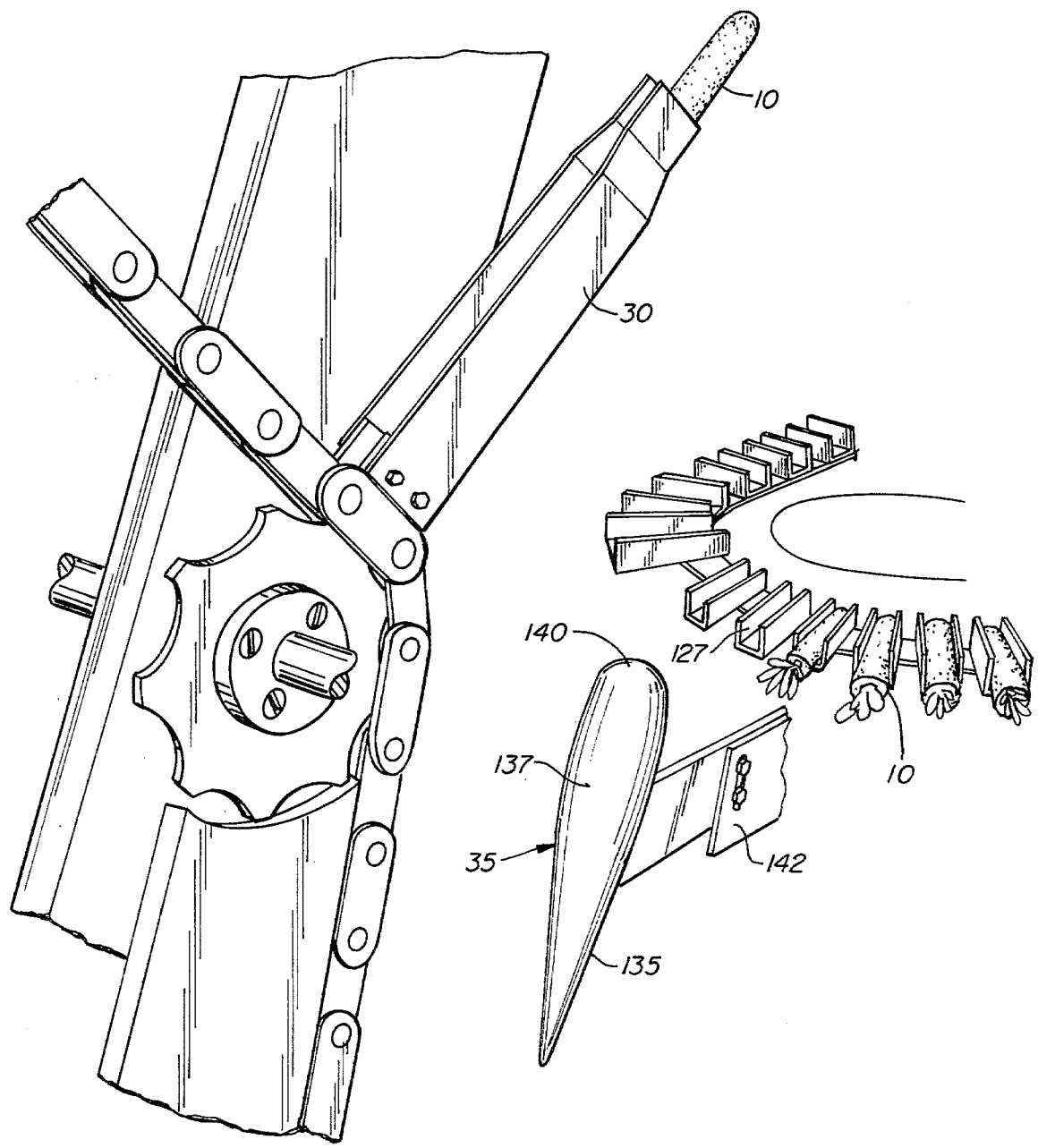
FIG._7C.

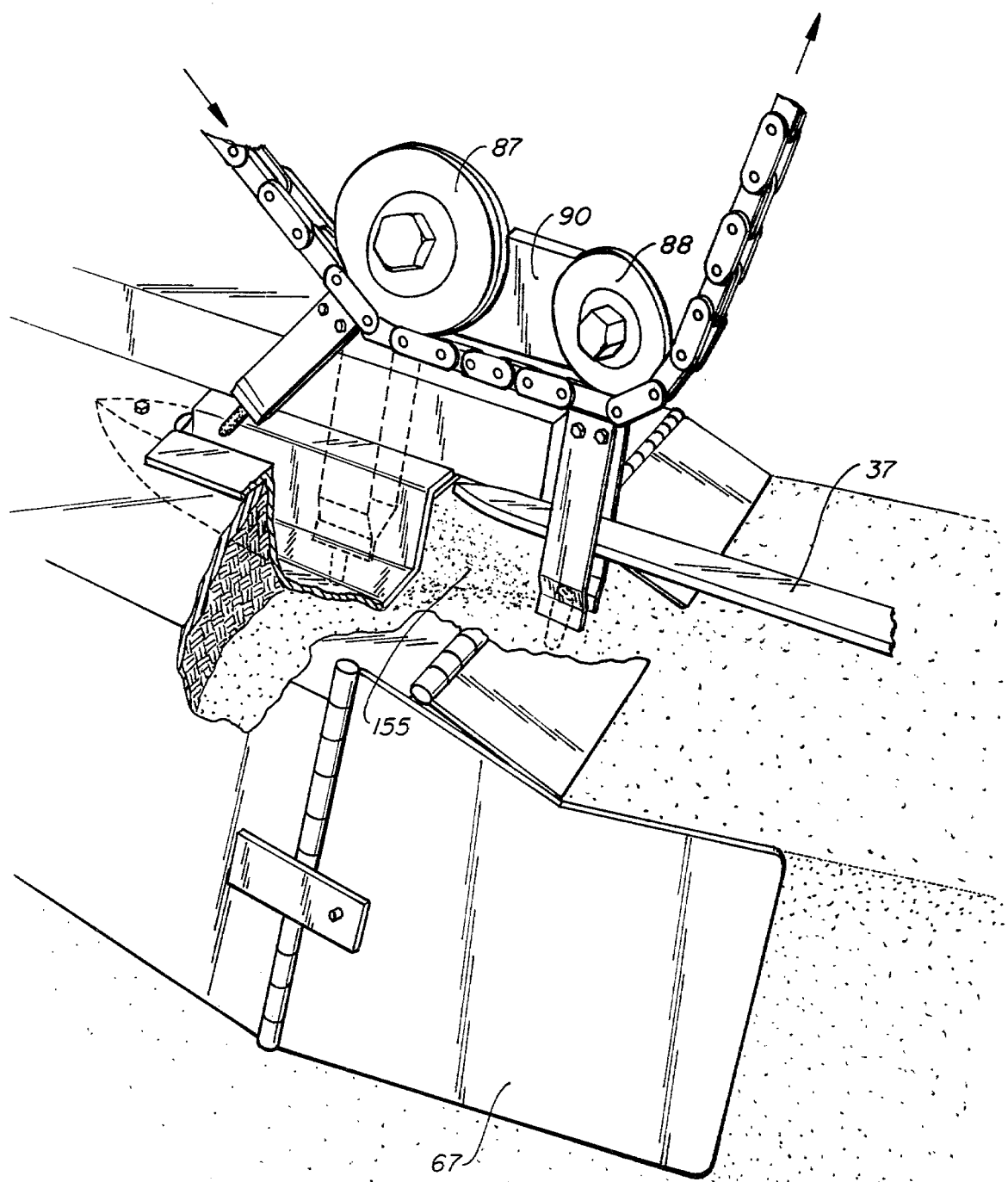
FIG._8.

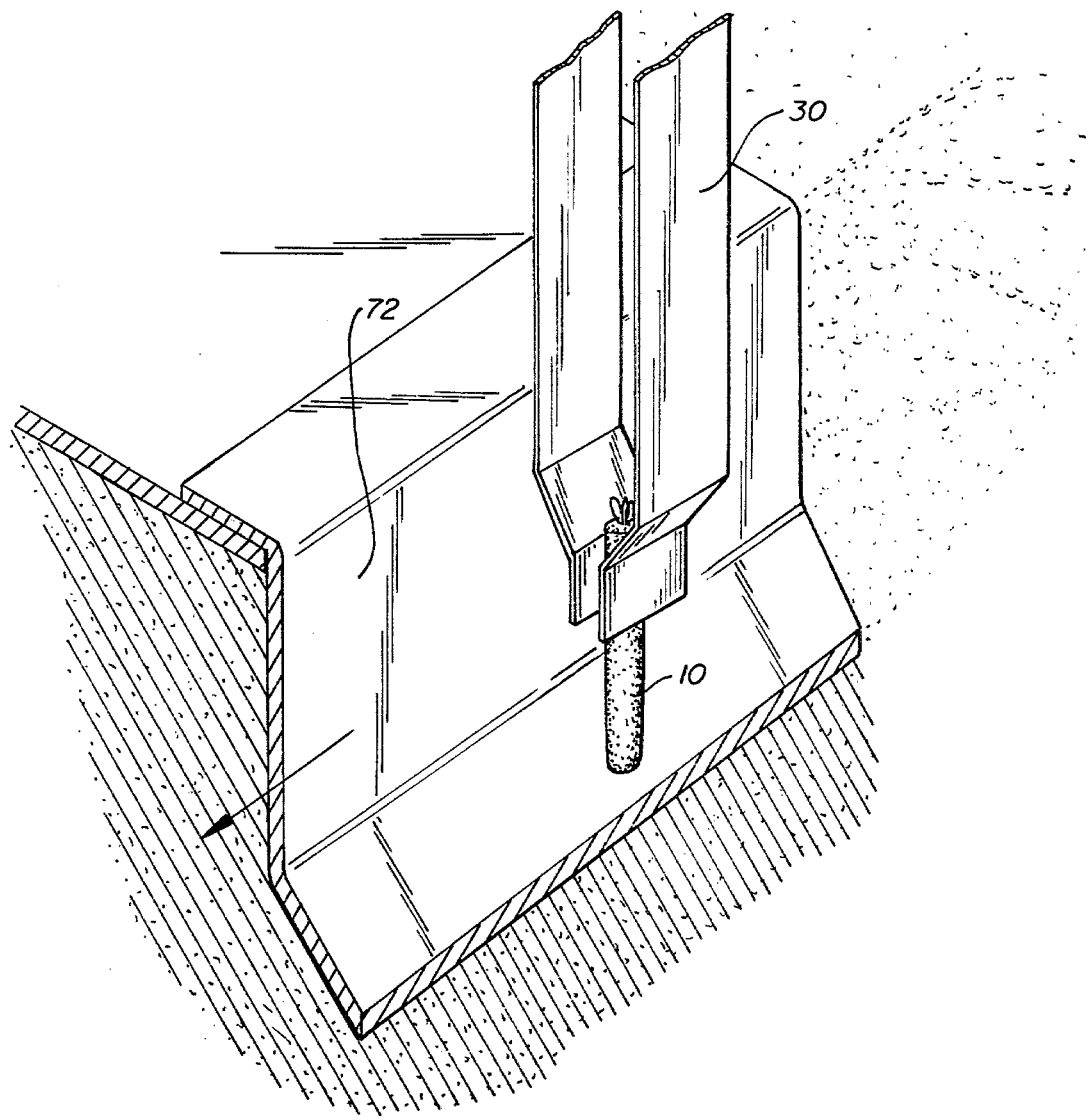
FIG._9A.
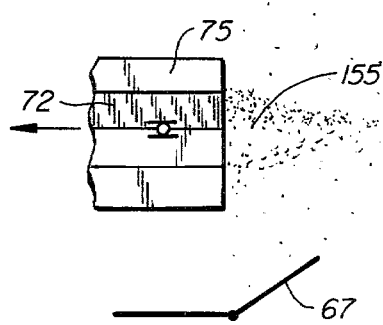
FIG._10A.

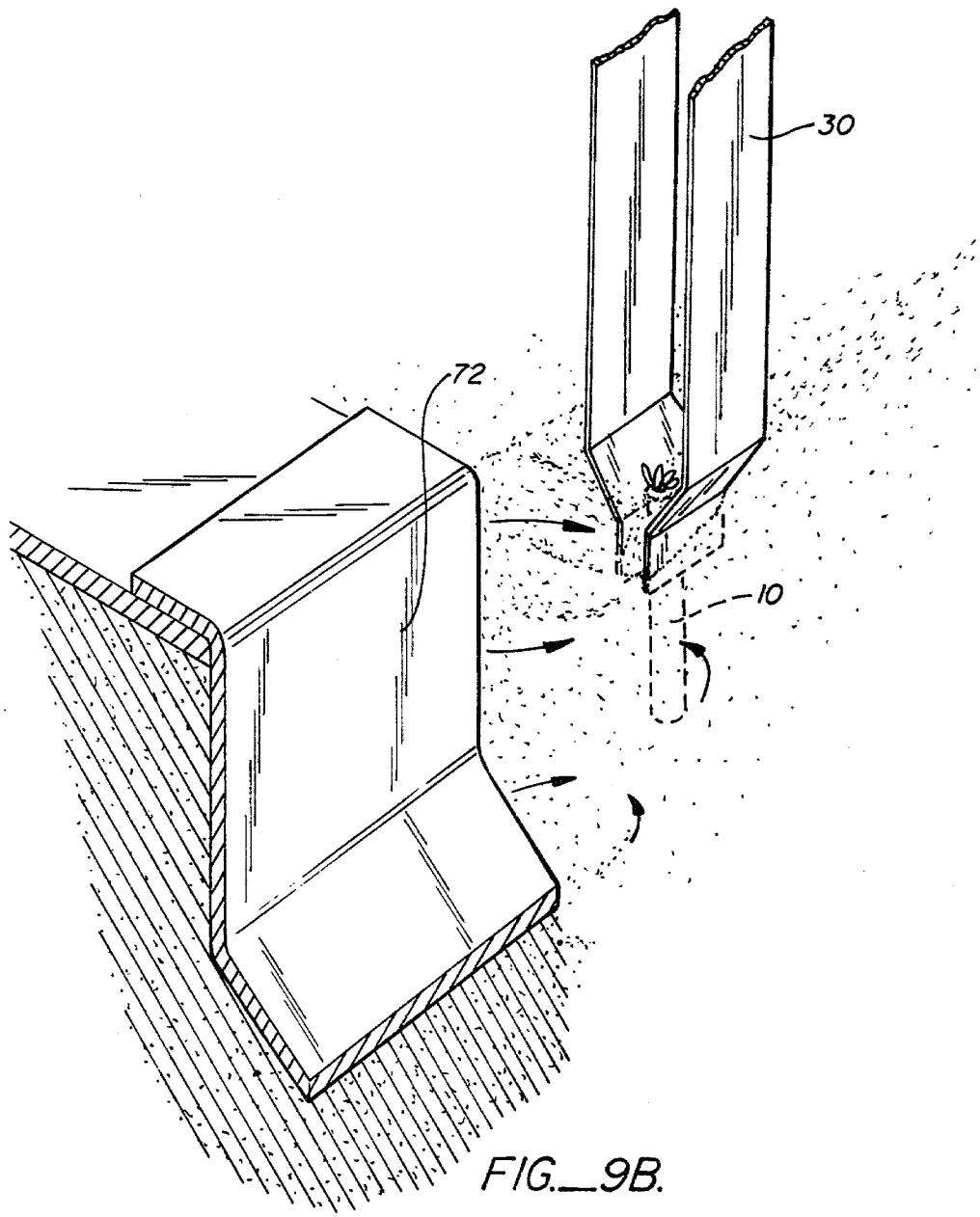
FIG._9B.
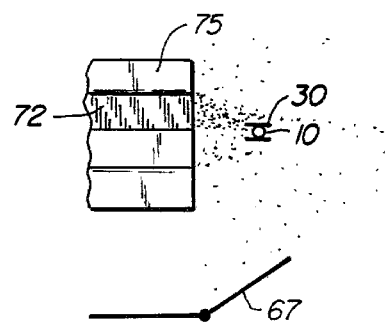
FIG._10B.

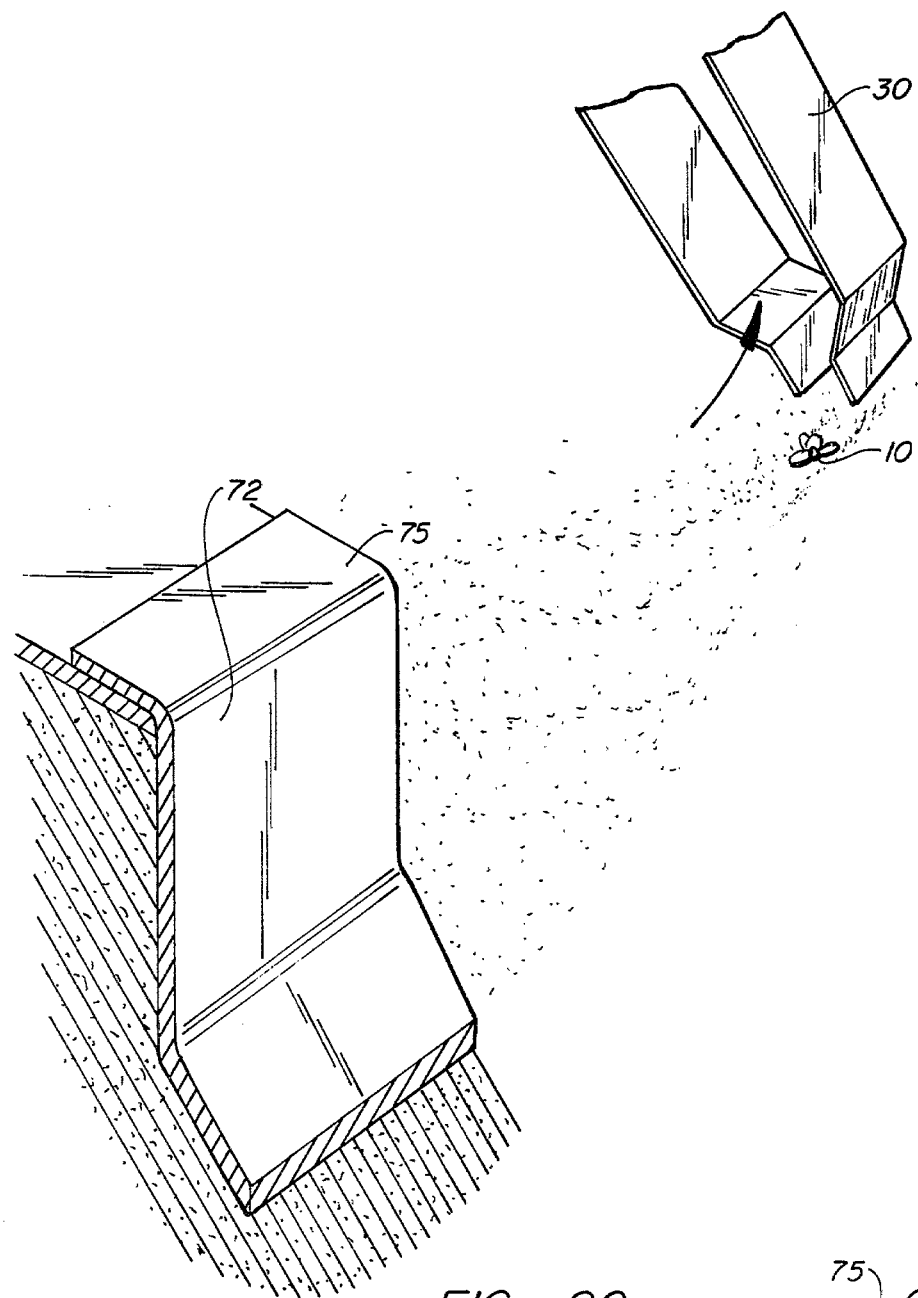
FIG._9C.
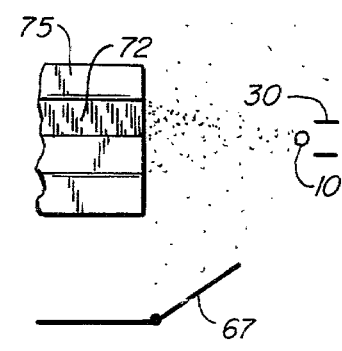
FIG._10C.

TRANSPLANTING MACHINE

FIELD OF THE INVENTION

The present invention relates generally to automatic planting apparatus, and more specifically to a machine for automatically planting seedlings grown in elastomeric soil plugs.

BACKGROUND OF THE INVENTION

If society's food needs are to be adequately met, it is of utmost importance that farmland be utilized as efficiently as possible. In particular, the yield per acre and the number of crops per growing season are relevant numerical parameters, the maximization of which is an ultimate object of any agricultural improvement. As the scale of farming has grown over the years, the emphasis has been on decreasing the amount of manual labor involved and increasing the uniformity of the operation. In the area of planting a field with a food crop characterized by discrete plants, a number of systems have been developed. These systems and the problems associated with them will be discussed so that the present invention may be better understood. For definiteness, the problems associated with planting lettuce will be considered. Given the size of lettuce heads at harvest, it is typical to plant lettuce on elongate raised beds bounded by irrigation trenches, preferably in two rows about 12 inches apart on a bed, with approximately 12 inch spacing between heads in a given row. The rows are preferably staggered so that the lettuce plants will be generally uniformly distributed over the bed.

The first method to be discussed is direct seeding. The bed is first prepared by cultivating the soil and causing elevated beds to be formed, appropriate cultivating and bed shaping machinery being well known in the art. A pair of spaced furrows are opened longitudinally in the bed, seed is spread out at appropriate intervals, and the furrows are closed over the seeds. In recognition of the fact that not every seed matures into a plant, the number of seeds sown is considerably greater than the anticipated number of plants with the seeds being relatively uniformly distributed along the rows. After a few weeks, when the seeds have sprouted into small plants, workers go through the field and thin out the beds so that the plants may grow without substantial interference from one another.

It is immediately apparent that direct seeding has several disadvantages. A first problem area is cost. In particular, the amount of labor required to thin the beds is considerable, which adds materially to the cost of planting. The reliance on manual labor also tends to result in relatively non-uniform spacing of the plants. Moreover, the cost of seed is significant in the overall operational costs, and typically 5 times a many plants are culled out as are left. This represents a substantial waste.

A second problem area is yield and land usage. Once the beds are thinned, the plants are still vulnerable, and while a crop yield in the neighborhood of 85% is often attainable, yields down in the 50% range are far from rare. Moreover, since the seeds are planted at uneven depths, the maturation of the plants is uneven, thus requiring multiple passes during the harvest season. The labor and other costs of this are self-evident. Partly in view of the fact that the entire growth cycle must occur in the field, and further due to the fact that the actual harvesting is prolonged due to the uneven maturation, the number of crops in a growing season is limited. By way of a particular example, the growing conditions in the Salinas Valley in California are such that two lettuce crops, or sometimes three, may be grown during a season.

Many of the problems that arise in the context of direct seeding have been at least partially overcome through the use of a transplant technique wherein seedlings are grown in a greenhouse under controlled conditions, and the young plants are planted at the desired spatial intervals. Since the early part of the growth of the plants takes place at a location other than in the fields, the amount of time that the field is occupied by the plants is decreased, thereby permitting, on the average, a greater number of crops during a particular growing season. For the example discussed above, three crops may be reliably grown. The labor involved in thinning the field due to the overplanting necessitated by the direct seeding technique, is avoided.

However, the rapid automated handling of seedlings is problematic since the delicate root system is especially vulnerable to mechanical shock and the like. A particularly promising technology involves growing the seedling in an elastomeric soil plug. U.S. Pat. No. 4,130,072 and the prior art cited therein suggests growing plants within polymerized soil plugs, and by handling the plugs alone, transplanting the plugs. The plug is cast from a slurry of soil and polymer into a small, generally cylindrical, resilient body having a seed receiving recess, and a seed is planted therein. The plug allows the development of the embryonic root system while providing a measure of protection. The nature of the elastomeric soil composition permits the seedling to be handled mechanically without killing the plant, while the uniform and regular shape of the plug makes it an attractive candidate for machine handling on a rapid and automated basis.

However, the requirements imposed on an automatic plug planting system are particularly stringent. Due to the extremely immature condition of the plant (the entire plug has an axial dimension of the order of 5 centimeters and a diameter of approximately 1 centimeter), the depth to which the plug is planted is especially critical. If the top of the plug is substantially above ground level, the delicate root system may become be exposed which would kill the plant. On the other hand, if the plug is planted too deeply, the growth may be arrested. As discussed above, any non-uniformity at planting time manifests itself as a costly non-uniformity at harvest time, either requiring additional passes through the field, or permitting unacceptable product variation. In the context of the soil plugs currently being commercialized, a vertical tolerance in the range of $\frac{1}{8}$-$\frac{1}{4}$ inch is considered a maximum.

At this point, it is also important to recognize the fact that the agricultural environment puts severe demands on a piece of apparatus. In particular, while a suitable engineering analysis and mock-up may show a technology to be promising, the ultimate commercial feasibility cannot be predicted without sustained field testing under a wide variety of soil and weather conditions while subjecting the machine to the less than gentle and careful treatment that one must expect it to undergo at the hands of a variety of operators.

There have been two main approaches to automatic plug placement, namely a plunger and dibble tube device, and a wheel planter. Both types of machine are typically pulled behind a tractor along the planting beds. These two machines will now be considered.

A plunger and dibble tube planter is disclosed in the copending, commonly owned U.S. patent application Ser. No. 62,667, filed Aug. 1, 1979, now U.S. Pat. No. 4,294,179, entitled "Dibble Tube Soil Plug Planter", and involves the simultaneous placement of a large number of plugs at a time. The machine operates on an intermittent basis, repeatedly stopping to place the plugs, starting and moving to a new location for plug placement, and stopping to repeat the cycle. The approach has not been found to meet the initial expectations since the intermittent nature of the machine operation typically renders the machine too slow to be economically competitive. It is generally not feasible to merely speed up the mechanical motions, due to the large mass that must be repeatedly accelerated and decelerated. Moreover, the mechanical configuration requires a large number of moving parts in a precision configuration so that the machine tends to be too complex and critically tuned for the sustained and trouble-free operation that commercial planting requires.

There has been developed and put into practice a commercially successful transplanting machine, broadly designated a wheel planter, that utilizes a planting wheel having distributed on its periphery a plurality of plug gripping mechanisms. The planting wheel is rotated about a horizontal axis transverse to the direction of planter travel at such a speed that the tangential speed of a plug is generally equal to the ground speed at which the planter is moved through the field, so that the plug is generally stationary with respect to the ground at the bottom of its travel. A small speed differential between the wheel bottom and the ground generally provides for a smoother release. An automatic feeder presents plugs to the soil gripping mechanisms on the planting wheel in a synchronous manner. The machine is moved over a prepared bed, a furrow is opened by a furrow opening tool, the plug is released at the bottom of its travel, and the soil is packed therearound by appropriate packing wheels.

The operation of the wheel planter, while satisfactory, is nevertheless characterized by a number of problems. The basic difficulty with the machine design is that the timing of the plug release is critical, since the plug is at the planting depth and nearly stationary with respect to the ground at one point only in the cycle. The soil must be packed around the plug at a precise moment in relation to the cycle. Assuming that the mechanical synchronization can be achieved, the timing is sufficiently critical that any attempt to increase the speed at which the machine is moved over the field results in a loss of synchronization, and consequential improper planting. A further limitation on the operating speed arises from the tendency of the furrow opening tool to toss the displaced soil off the edge of the bed, thus making it impossible for the packing wheels to pack the soil around the plug. A ground speed of about 1 mile per hour is about the maximum.

The use of packing wheels presents additional difficulties in that the concentrated wheel loads applied to the edges of the bed crumbles the edges so as to leave the plant with insufficient support later on in its growth cycle. For some plants such as lettuce, the result is unacceptable shape variation. A further problem with the packing wheels arises under muddy conditions since soil material builds up on the wheels. This has the dual effect of degrading the bed edges and changing the effective wheel diameter. Since rotation of the packing wheel is typically used to establish the planting wheel rotation, loss of synchronization results.

Even if the above problems are avoided by operating the machine under optimal conditions, there is a considerable non-uniformity in the depths to which the plugs are set in the ground, thus requiring a crew of workers to follow after the machine and straighten out the plugs, to place soil around the plugs in an attempt to achieve the desired planting depth, and to hand-plant plugs where the machine was unsuccessful in placing a plug properly. It is estimated that 30–40% of the plugs are improperly set, requiring some further manual attention. Thus, for each worker on the machine loading seedling plugs into the feeder, there is typically required another worker to follow after the machine doing "clean up."

Therefore, in spite of the demonstrated commercial success of the wheel transplanter, the sight of 8 to 10 workers, bent double at the waist, following after the machine cannot help but leave the viewer with the feeling that there must be a better way.

SUMMARY OF THE INVENTION

The present invention provides apparatus and a method for transplanting soil plugs with great uniformity and a minimum of manual labor. In particular, the apparatus according to the present invention establishes the plug depth and lateral placement with considerably greater precision than that available according to prior art systems, and avoids critical mechanical timing mechanisms so that it may be used under a wide variety of conditions and over a range of speeds. Surprisingly, it has been found that the apparatus is capable of placing 95–98% of the plugs properly while operating at ground speeds in excess of 3 miles per hour. The high ground speed combined with the high percentage of properly placed plugs permit the planting of a field in far less time with fewer people than previously possible.

Broadly, a transplanting machine according to the present invention comprises a conveyor having a plurality of soil plug gripping mechanisms mounted thereto, a furrow opening device, and a furrow closing device. The conveyor is characterized by a path that includes a horizontal lower path portion extending parallel to the ground along the direction of travel of the machine. The conveyor is driven synchronously with respect to the machine's ground speed so that a gripping mechanism moving along the lower horizontal path portion has a speed relative to the machine generally corresponding to the ground speed of the machine but in the opposite direction. The elevation of the conveyor and the size of the gripping mechanism are such that when a soil plug is lowered into the furrow opened by the furrow opening device, the plug is held at the proper planting depth. Due to the speed at which the conveyor is driven, the plug remains at a generally fixed position relative to the ground while it is at the proper planting depth. The furrow closing device operates to close the furrow around the gripped plug while the plug is held at the proper planting depth. Thereafter, the gripping assembly is caused to release the plug. The apparatus also preferably comprises a carousel feeder operated synchronously with respect to the conveyor in order to sequentially present the plugs to the gripping assemblies on the conveyor. A trailing roller packs down the ridge of material that forms along the line of the closed furrow.

The furrow closing device of the present invention is preferably defined by portions of a bed shaper that operates to form the soil into a trapezoidal planting bed. In addition to the normal function of shaping the bed, the bed shaper establishes a ground level with respect to which the plugs are planted. Additionally, the rear portions of the bed shaper act to close the furrow, and include adjustable tabs that may be set to control the timing of the closure relative to the plug positioning in order to provide optimal plug placement under differing soil conditions. It should also be noted that the bed shaper acts to confine the soil during the opening of the furrow. This has the important result of eliminating problems due to loss of soil when the furrow is opened at high speeds. Thus, a major speed limitation is avoided.

Each plug gripping assembly preferably comprises a center opening clip having opposed resilient fingers. The fingers extend generally perpendicular to the conveyor path and are preferably flat, being formed from sheet spring steel or similar material. The flat configuration is advantageous since it provides a small cross-section in the plane perpendicular to the movement of the conveyor, and thus a low moment of inertia so that the fingers can close quickly about a plug. This allows reliable operation that is substantially uniform over a wide range of ground speeds. The thin cross section also has the advantage of allowing easy exit from the soil once the soil has closed around the plug. At the same time, the finger material has sufficient extent parallel to the direction of motion to provide substantial rigidity along the direction of motion. The construction of the fingers as opposed spring steel elements is particularly simple and economical, while the use of material such as spring steel makes the fingers highly resistant to abrasion.

As described above, the conveyor path is characterized by a lower horizontal path portion that maintains the plugs at the proper planting depth for a significant interval so that the soil may be properly closed around the plugs before the plugs must be released. Preferably, the conveyor comprises roller chain having relatively long links for stability, and being guided along the edge of a plate to further resist rocking. The use of roller chain permits the spacing of the clips along the conveyor to be varied as needed for the particular planting configuration.

The conveyor path is preferably inclined in the region that the clips take up the plugs in order to compensate for the inertia of the plugs which tends to cause the plugs to angle downward. In particular, the clip grasps the plug near the ultimately upper end thereof, so that once the plug has been partially grasped to a degree sufficient to move it from the carousel feeder, the ultimately lower portion of the plug angles downward due to gravity and inertia. The angle of the inclined portion of the conveyor path corresponds to the angle assumed by the plug so that the plug is perpendicular to the conveyor when the clip has completely gripped it.

In operation, the transplanting machine according to the present invention places the plugs in the ground at a precise uniform depth and in straight even rows. The depth control is in part due to the fact that the bed is shaped and the conveyor is vertically registered precisely to the top surface of the bed shaper. The plugs are held in the fingers perpendicular to the conveyor due to the inclined conveyor portion, so that the plugs are properly registered to the fingers and vertical when they are in planting position. Additionally, since the plugs are at the proper planting depth for a significant interval of time due to the horizontal path portion of the conveyor, the soil closure can be timed so that the soil at least partially closes around the plug prior to the plug's being released. The trailing roller, the placement of which was originally dictated by a desire to eliminate the ridge of soft soil material that overlies the furrow, further acts to consolidate the soil closing and better define the top bed surface.

The uniform horizontal positioning on the bed arises from the fact that the soil is closed about the plug prior to the plug's being released, with the conveyor being horizontally (as well as vertically) registered to the bed shaper. Where two adjacent conveyors and associated feeders are used to plant double rows on a single bed, the chains of the conveyors are easily synchronized to achieve the proper staggering of plants on the bed. The use of the bed shaper also avoids the problems associated with disturbing the edges of the bed which can cause a certain degree of lateral shifting.

Not only does the transplanting machine produce superior results, but it is a versatile piece of equipment capable of producing these results for a wide variety of soil conditions and over a considerable speed range. The proper operation under varying soil conditions, including muddy field conditions, arises from a cooperation of the bed shaper and the clip design. In particular, the bed shaper forms the bed immediately prior to planting so the soil is properly workable and confined within the bed shaper, thus permitting the furrow to be opened and closed reliably. Adjustment of the trailing tabs on the bed shaper allows the closure of the soil to be controlled in order to effect a proper plug positioning. The small cross section of the clip in a plane perpendicular to the direction of conveyor travel allows for a smooth exit from the soil so that the plug positioning is not disturbed. The use of the center opening clips allows the incorporation of a cleaning device to remove soil material such as caked mud from between the opposed fingers.

The proper operation of the machine over a considerable speed range is achieved partly due to the fact that the clips traveling over the horizontal path portion of the conveyor are at proper planting depth for a considerable interval so that the timing of the release is relatively non-critical. Also, the bed shaper confines the soil so that the machine may be operated at high speed while preserving the integrity of the bed. Moreover, the clips, having low inertia in the direction of opening and closing motion, can grasp the plugs reliably, even if operation of the machine is speeded up.

For a further understanding of the nature and advantages of the present invention, reference should be made to the remaining portions of the specification and to the attached drawings.

BRIEF DESCRIPTION OF THE DRAWINGS

FIG. 1 is a perspective view of a transplanting machine operating in the field;

FIGS. 2A and 2B are exploded isometric views showing the major components and their interrelationships.

FIG. 3 is a perspective view of the machine frame and bed shaper;

FIG. 4 is a perspective view of the furrow opening tool;

FIG. 5 is a side elevational view of the conveyor;

FIG. 6 is an isometric view of a plug-gripping clip;

FIGS. 7A–C are perspective views illustrating the sequence of picking up a plug;

FIG. 8 is a perspective view showing the operative components for placing a plug in the ground;

FIGS. 9A–C are perspective views illustrating the sequence of placing a plug in the ground; and FIGS. 10A–C are simplified top, partially sectioned views corresponding to FIGS. 9A–C.

DETAILED DESCRIPTION OF THE INVENTION

Overview Of Structure And Operation

FIG. 1 is a perspective view illustrating a transplanting machine 5 carrying a plurality of elastomeric soil plugs 10 (hereinafter, simply "plugs") formed and sprouted within a tray-mold 11. Machine 5 is pulled behind a tractor 12 over a field 15, and references to direction in remaining portions of the specification will be with reference to the forward direction of tractor 12. In operation, transplanting machine 5 forms a planting bed and transplants plugs 10 in one or more rows on a given bed. The soil in field 15 may have been already worked into beds which will be in fact reshaped somewhat by machine 5, but preferably, the soil has been listed so that the initial bed formation is carried out by machine 5. The embodiment of machine 5 as shown in FIG. 1, and as shown and described in more detail below, is a machine for planting two staggered rows on one bed. For clarity, some of the drawings will show only those portions of the mechanism required for planting one of the rows on the bed. It will be readily be appreciated that efficiency in a commercial planting environment will typically require that multiple beds be formed and planted on a single pass of tractor 12. In particular, two or four beds should typically be formed and planted on a single pass. An even number of beds is dictated by the desire to render the load on the tractor symmetric, given that the beds are normally sized so that tractor 12 straddles two adjacent beds with its wheels in the trenches flanking the two beds.

The general operation of transplanting machine 5 may be initially described with additional reference to FIGS. 2A–B, 3, and 4 which show the major components. Thereafter, the major components will each be described in detail, after which the detailed operation will be explained.

Machine 5 includes a frame 17 supported from the rear of tractor 12, from which frame a bed shaper 20 is supported. A furrow opening tool 22 is mounted to bed shaper 20 so that as machine 5 is moved over field 15, furrow opening tool 22 opens a plug-receiving furrow in the newly formed bed, the furrow being subsequently closed by remaining portions of bed shaper 20. A conveyor 25 is driven at a speed corresponding to the ground speed of machine 5, as determined by a ground engaging device drive 27. Conveyor 25 carries a plurality of plug gripping clips 30, each of which is adapted to securely grip a plug 10. Plugs 10 are sequentially fed to clips 30 by a carousel feeder 32 driven synchronously with conveyor 25 so that a passing clip has a plug presented to it as it moves past the feeder. The gripped plug is lowered into the opened furrow prior to the furrow's being closed. First and second wedge members 35 and 37 are located at strategic points along the conveyor path to effect plug take-up and plug release. A following roller 40 is mounted to the rear of the machine and rolls over the bed with planted seedlings therein. It should be noted that for each row to be planted on the bed, a separate furrow opening tool, conveyor with clips thereon, feeder, and pair of wedge elements is required, all being mounted to bed shaper 20.

Detailed Structure

Turning now to the specific structural details of the components mentioned above, these will be described in the order mentioned above. In particular, frame 17, bed shaper 20, furrow opening tool 22, conveyor 25, clips 30, feeder 32, and wedges 35 and 37 will be described in order.

Frame 17 may be described with reference to FIG. 3. Frame 17 comprises front and rear transverse tool bars 42 and 45 spaced apart by a plurality of stand-offs 47. Three standoffs for holding tool bars 42 and 45 on 12 inch centers is typical. Front tool bar 42 is supported from an A-frame assembly (not shown) that mounts to a standard three-point tractor hitch (also not shown). Since the three-point hitch and A-frame assembly are standard and are not part of the invention, they will not be described.

Bed shaper 20 may be described with reference to FIGS. 2A and 3. Bed shaper 20 is of steel plate construction and includes a top horizontal plate 55 and symmetrically disposed downwardly and outwardly extending side plates 57 and 58 to define a generally trapezoidal configuration. The plates are flared outwardly and upwardly at their front portions to define a flared opening 60 into which soil material is funneled. Top plate 55 carries a studded mounting pad 62 and further has welded thereto a front vertical tool bar standard 63 and a pair of spaced rear tool bar standards 64. Front tool bar standard 63 and rear tool bar standards 64 are not mounted to front and rear tool bars 42 and 45, respectively, by standard tool bar clamps. Mounting pad 62 supports the conveyor and feeder assemblies as will be described below. Top plate 55 carries along its rear transverse edge a hinged top trailing tab 65 while side plates 57 and 58 carry along their respective rear edges hinged side trailing tabs 67 and 68. The respective angles of trailing tabs 65, 67, and 68 with respect to their respective plates may be varied to adjustably regulate the bed formation as will be described below. Top plate 55 is provided with as many rearwardly opening slots 69 as there are rows to be planted. Slots 69 extend through top trailing tab 65.

Furrow opening tool 22 may be described with reference to FIGS. 2A, 4, and 8. Furrow opening tool 22 is mounted under top bed shaper plate 55, and includes a soil parting portion 70 at the leading end thereof, and a longitudinally extending rearwardly open trough 72 immediately behind soil parting portion 70. Trough 72 has top horizontal flanges 75. The width of furrow opening tool 22 is such that it may snugly fit into one of rearwardly opening slots 69 on top bed shaper plate 55, with flanges 75 being disposed on the top surface of top plate 55. Thus, with furrow opening tool 22 mounted to bed shaper 20, an upwardly and rearwardly opening trough is defined and presented. In the embodiment illustrated, soil portion 70 is a stationary blade, which is suitable for many applications where the field has not been recently harvested. However, in some instances, a field will be harvested one day, cultivated the next day, and planted the following day, with the consequence that the soil of the field at planting time contains numerous roots from the harvested crop, which roots have not had an opportunity to decompose. In such a case a cutting wheel is preferable to the stationary blade illustrated.

Conveyor 25 may be described with reference to FIGS. 2A, 5, and 8. It should be remembered at this point that bed shaper 20 is indexed to frame 17 and hence tractor 12, and the height of bed shaper 20 may be adjusted relative to tractor 12 by adjusting the setting of tool bar standards 63 and 64 and the A-frame assembly. The remaining mechanisms, on the other hand, are indexed with respect to bed shaper 20. Conveyor 25 comprises an endless loop of roller chain 80, the path of which is constrained to a vertical plane, the path contour being defined by a drive sprocket 82 carried on a horizontal transverse axle 83, a tension idler 85, and front and rear lower idlers 87 and 88. In order that tangential acceleration be minimized over those portions of the path where clips 30 are carrying plugs, sprocket 82 and idlers 85 and 87 are of relatively large diameter, say approximately 6 inches. On the other hand, once the plug has been released, a relatively large tangential acceleration is desirable so that the clip quickly leaves the vicinity of the released plug. Accordingly, rear lower idler 88 is of relatively small diameter, say approximately 3 inches. A lower guide plate 90 is disposed between lower idlers 87 and 88 while a rear guide plate 91 is disposed in the region between rear lower idler 88 and drive sprocket 82. Idlers 85, 87, and 88, and guide plates 90 and 91 have smooth edges and are of a thickness to support conveyor chain 80 and prevent lateral motion thereof. The entire conveyor assembly is supported on a conveyor frame 92 which has a lower horizontal plate 93 that is held by nuts to studded mounting pad 62 on bed shaper 20. Guide plate 90 and idlers 87 and 88 define a lowermost horizontal path portion 95, while guide plate 91, idler 88, and drive sprocket 82 define a rear upwardly inclined path portion 97. The elevation of lower path portion 95 above top plate 55 of bed shaper 20 is such, relative to the size of clips 30, that a gripped plug is at proper planting depth when moving along horizontal path portion 95. A degree of control over the planting depth may be achieved by permitting a small amount of vertical adjustability of conveyor frame 92 relative to bed shaper 20. This may include a small fore and aft tilt. The term "horizontal path portion" will be taken to include any slightly tilted lower path portion that comes about as a result of what is in essence a small vertical adjustment. Inclined path portion 97 extends at least as far as the region of plug pickup near feeder 32, and the significance of the inclination will be described below.

Ground engaging drive 27 may be described with reference to FIGS. 1 and 2B. In particular, a ground engaging wheel 102 is supported from rear tool bar 45 and rolls in the trench beside one of the beds being maintained in contact with the ground by a biasing spring 105. A first gearbox 106 transmits rotation of wheel 102 to a generally vertical driveshaft 107, while a second gearbox 108 on axle 83 transmits the rotation of driveshaft 107 to axle 83. Gearboxes 106 and 108 are right angle bevel gear units such as those manufactured by Tol-O-Matic Company, Minneapolis, Minn. and sold under the trademark "Float-A-Shaft." Typical gear ratios of gearboxes 106 and 108 are such to provide 2:1 and 2.5:1 increases, respectively, being determined by the requirement that they produce a conveyor speed generally corresponding to the ground speed of the machine 5. Actually, for reasons to be described below, conveyor chain 80 is usually driven at a speed that is approximately 5–15% below the machine ground speed. Thus, the clips are more closely spaced on the chain than the plant separation in the field. For example, a clip spacing of 10 inches for a planting separation of 11 inches is typical. The direction of motion is such that the movement of the conveyor on lower path portion 95 is in the backward direction, that is opposite to the motion of the machine.

Clips 30 may be described with reference to FIGS. 2A, 5, 6, and 7A–C. In particular, any given one of clips 30 is a center opening spring clip comprising opposed flat resilient fingers 110 and 112 bolted to mounting tabs on opposite sides of an extended link 115. Fingers 110 and 112 are generally parallel to one another, and extend perpendicularly with respect to chain 80. Fingers 110 and 112 are stepped near their ends so that respective end portions 117 and 120 are parallel to, and in contact with each other. Finger end portions 117 and 120 define the plug contacting portions of clip 30 while the major portion of fingers 110 and 112 provide the resilience to bias end portions 117 and 120 together. The biasing force on the gripped plug is generally comparable to that exerted by a common spring clothespin. The preferable material for fingers 110 and 112 is 1/32 inch thick high carbon spring steel (e.g. 10–95 spring steel) sheet. Typical dimensions are approximately 1 inch along the chain by 6 inches perpendicular to the chain.

Plug feeder 32 may be described with reference to FIGS. 2B and 7C. Feeder 32 is a carousel feeder comprising a horizontal loop of chain 125 to which are serially mounted a plurality of plug holders 127, each plug holder being in the form of an open-ended trough. Chain 125 is driven in synchronization with conveyor 25 such that plugs in respective plug holders 127 are sequentially presented to clips 30 on a one-to-one basis. Synchronous drive is provided by a reduction drive comprising a 1:1 gearbox 129 on axle 83, a 10:1 gearbox 130, and an intermediate driveshaft 132. Gearboxes 129 and 130 are of the type described above. The plugs are disposed in their respective plug holders with their ultimately upper ends (leafy portions) facing outwardly. The present invention does not depend on the manner in which plugs 10 find their way from tray-mold 11 into plug holders 127. However, by way of background, it should be noted that plugs 10 are generally cylindrical, having been preferably molded in a closely spaced array in tray-mold 11 which also serves as a growing tray. Once the seedlings are of a maturity for transplanting, they may be loaded into plug holders 127 manually or automatically. Where manual loading is used, a worker is positioned by feeder 32, typically sitting on a seat supported frame 17. The aforementioned U.S. patent application Ser. No. 62,667, especially at pages 17–20, discloses a mechanism for automatically removing plugs from a tray-mold, and the disclosure therein is hereby incorporated by reference.

Upper clip opening wedge 35 may be described with reference to FIGS. 2A, 5, and 7A–C. The function of wedge 35 is to cause a passing clip 30 to open as it approaches feeder 32, and to close about a presented plug. In particular, the clip is first caused to assume a position wherein finger end portions 117 and 120 are on opposite sides of the presented plug and to then close quickly without snapping so as to grip the plug firmly without breaking it and to remove the plug from its respective plug holder 127. The shape of wedge 35 is characterized by a lower generally conical portion 135 characterized by a small cone angle, an intermediate generally cylindrical portion 137, and a top rounded butt portion 140. Wedge 35 is mounted to a bracket 142 which is fixed to conveyor frame 87. Bracket 142 allows a small amount of vertical positioning of wedge 35 so that the timing of the clip closure may be optimized.

Lower wedge 37 may be described with reference to FIGS. 2A, 5, and 8. The function of lower wedge 37 is to cause a clip moving along lower horizontal conveyor path portion 95 to release its gripped plug at a position shortly behind the point at which the soil is closing. Wedge 37 may be in the form of a horizontal blade having a forward facing pointed region 145.

Operation

The operation that occurs as machine 5 is moved over field 15 may be summarized with respect to a given plug 10 as follows. Plug 10 is loaded into one of plug holders 127 and sequentially moved until it is in position to be taken up by a corresponding clip 30. Plug 10 is then carried around the conveyor path, lowered so that it is traveling along lower horizontal path portion 95 at the proper planting depth, moving forward at a small velocity relative to the ground. As the machine moves forward, the soil closes around the plug 10, after which time clip 30 is caused to release the plug. These operations will now be set forth in detail.

FIGS. 7A-C illustrate the sequence of taking up a plug. Refering first to FIG. 7A, clip 30 is seen traveling generally upwardly along inclined path portion 97, as denoted by arrow 147. As clip 30 moves upwardly past upper wedge 35, fingers 110 and 112 are progressively spread as they traverse conical region 135, being held in maximum separation as they pass over cylindrical region 137. As the fingers pass upwardly along both sides of cylindrical region 137, finger end portions 117 and 120 straddle the ultimately upper portion of plug 10. It should be noted that upper butt portion 140 of wedge 35 is relatively short in its axial dimension so that the fingers are caused to close around plug 10 over a relatively short distance of travel. However, butt portion 140 is rounded so that the fingers do not snap shut which could have the effect of breaking the plug. As the fingers are closing, as most clearly shown in FIG. 7B, the removal of plug 10 from its plug holder is begun.

During the initial stages of its removal from the plug holder, the plug tends to angulate downwardly. This occurs since plug 10 is gripped near its ultimately upper end, and as such, its center of gravity is displaced from the position of gripping. During the time that the plug is gripped firmly enough to cause it to move upwardly, but not yet fully gripped, the weight of the plug causes downward angulation as the plug is partly removed from its plug holder. Additionally, since the clip is moving, the inertia of the plug causes further angulation. This downward angulation is compensated by the inclination of the conveyor path at the point of take up so that once the plug is fully gripped, the plug extends generally perpendicularly with respect to the supporting portion of chain 80. It should be noted that in its gripped condition, the plug is substantially deformed. In particular, the upper ½ inch or so of a ½ inch diameter plug is typically compressed to a thickness of about ⅛-¼ inch.

The direction of travel along the conveyor path changes relatively quickly after the clip closure to move clip 30 away from plug holder 127 and thus quickly pull plug 10 clear of plug holder 127. This feature has significance in two respects. The first, relevant where plug holders 127 are closed at their respective inner ends is that jamming of the plug into the trough end is avoided. This is not a problem in an embodiment where an automatic loading mechanism is employed since the plug holders are open at both ends. However, the rapid change in direction of the conveyor path has the effect of quickly disengaging the plug from its respective plug holder. This is desirable since feeder chain 125 is moving synchronously with respect to conveyor chain loop 80 and at right angles thereto. Therefore, undue delay in the removal of the plug from the plug holder would have the effect of subjecting the plug to potentially harmful shearing forces.

Once plug 10 has been removed from its respective plug holder 127, it continues its travel along the conveyor path, ultimately approaching lower horizontal path portion 95 from the front end of the machine, traveling in a backward direction along the machine as the machine moves forward over field 15. This is shown in FIG. 8. Broadly, the sequence of placing plug 10 in the ground occurs as follows. First, clip 30 with plug 10 therein is lowered into the furrow opened by furrow opening tool 22, and passes backward within the confines of longitudinal trough 72 which prevents the closure of soil therearound. Thus, trough 72 maintains the furrow open over the trough length, and as machine 5 moves forward, soil closes behind trough 72 in a V-shaped pattern shown generally at reference numeral 155.

The sequence of plug placement in the ground is illustrated in the sequential perspective views of FIGS. 9A-C. Reference should also be had to the corresponding simplified top views of FIGS. 10A-C. It should be noted that the major movement is of the machine relative to the ground, with the plug remaining at a generally fixed position relative to the ground (i.e. moving at about 5-15% of the machine ground speed). FIG. 9A shows the gripped plug as it moves backward at a point in time when it is still within the confines of trough 72. In actual fact, the plug is relatively stationary and trough 72 is moving forward with a trailing wave of closing soil in its wake. The point of closure relative to the rear of trough 72 depends on the soil condition and the angular position of the trailing tabs, most particularly top trailing tab 65. For sandy soil, a generally horizontal inclination of top trailing tab is suitable, while muddy or cloddy soil requires increased downward inclination to achieve the same closure point.

FIG. 9B shows plug 10 when it is no longer within the confines of trough 72. Rather trough 72 has moved forward so that plug 10 has become enveloped in the closing soil. The closure of the soil around gripped plug 10 occurs as the traveling region of closing soil envelops it. Since the traveling soil closure region is moving in the same direction as the machine, the closing soil material comes in from behind the plug. Moreover, the soil material starts closing from the bottom of the furrow and works its way up. Accordingly, there is a tendency for the soil closing about plug 10 to exert a forward force on the bottom of the plug. Since the plug is resilient, if the top of the plug were held absolutely stationary relative to the ground, the plug would be bent, and once released, the resilience would cause the plug to angle backward. To overcome this tendency, clip 30 is not maintained absolutely stationary relative to the ground, but is caused to have a small forward component of motion so that the forward forces on the lower portion of the plug due to the soil closure are accompanied by a forward force on the top portion of the plug imparted by the clip itself which is still gripping the plug. Thus, as the soil completely closes around the plug, the plug is maintained in a substantially vertical orientation. During the closure, fingers 110 and 112, and most notable finger end portion 117 and 120 keep soil off the seedling leaves.

The continued motion of clip 30 along lower conveyor path portion 95 causes clip 30 to be engaged by pointed front portion 145 of lower clip opening wedge 37. This causes the fingers to spread apart, thereby releasing the plug. The opening of the fingers has the effect of spreading the soil away from the top portion of the plug. The release preferably occurs when the soil closure point has progressed to a point about 1 inch forward of the plug. Clip 30 then swings upwardly and backwardly past the released plug, commencing its travel along rear inclined path portion 97. As clip 30 swings upwardly, wedge 37 scrapes any mud or other caked material that might be caught between fingers 110 and 112, thus cleaning the clip so that it can effectively and reliably grip a new plug as it passes upwardly past feeder 32.

Further motion of the machine closes the soil around the top portions of the plug. After the rear edge of top trailing tab 65 has passed the plug, the plug can be considered planted. However, since slots 69 extend through trailing tab 65, there is typically formed a longitudinal ridge of soft, somewhat fluffy soil material. Removal of this ridge is believed desirable to reduce the likelihood of certain soil-borne diseases being transmitted to the seedlings. The soil ridge has a tendency to melt away if the field is irrigated relatively immediately, but this is not always possible. Accordingly, the ridge may be removed by roller 40 which rolls right over the seedlings. Roller 40 also has the effect of further consolidating the positioning of the plug.

In summary it can be seen that the present invention provides a soil plug transplanter that automatically plants soil plugs at a uniform depth and in a proper horizontal alignment. This substantially eliminates the need for costly manual labor and produces a more uniform result at planting. This translates to a more uniform result at harvest time with a greater crop yield. The improved operation of the machine is not at the cost of versatility and reliability, but rather is in fact accomplished by a machine that is surprisingly versatile and reliable. Thus, the machine operation is characterized by relatively low maintenance and fast operation. Therefore, the machine can operate over a speed range and a variety of soil conditions suited to a particular planting circumstance. The plant spacing can be easily varied while synchronization of the machine is considerably less critical than on prior art machines.

While the above provides a full and complete description of the preferred embodiment of the present invention, various modifications, alternate constructions, and equivalents may be employed without departing from the true spirit and scope of the invention. For example, while the preferred embodiment has the clips mounted perpendicular to the conveyor, and has the conveyor constrained in a vertical plane, it would also be possible to have the conveyor loop lying in an inclined plane with the clips angled relative thereto so that they are perpendicular to the ground when traveling along the lower path portion. Additionally, while efforts are made to make sure that the plugs are held in the ground in a vertical condition with the tendency of the soil closure to tilt the plugs being compensated by imparting a small ground velocity to the plugs (by slightly slowing the conveyor relaive to the ground speed), a similar compensation could be achieved by having the plugs at an inclination when lowered into planting position so that the closure of the soil would straighten them out.

It will also be appreciated that several of the improvements described above, which improvements contribute to the dramatic and surprising increased effectiveness of machine 5, could also provide significant benefits if applied to prior art machines. For example, the use of a bed shaper rather than packing wheels would at least eliminate those problems associated with packing wheels. Similarly the clip design and the inclination on plug pickup would have a beneficial effect if incorporated into a wheel planter.

Therefore, the above description and illustrations should not be construed as limiting the scope of the invention which is defined by the appended claims.

We claim:

1. A method for planting a cylindrical plug containing a seedling in the ground from a moving platform comprising the steps of:
    opening a furrow of controlled depth in the ground by means attached to said platform;
    gripping a plug between opposing faces of bladelike pieces of a clip means;
    conveying said gripped plug by said clip means to a vertical position along a horizontal path within said furrow while said platform is moving, a portion of said blade-like pieces being disposed below ground level with edges aligned along the direction of movement;
    maintaining said plug generally stationary at said vertical position with said gripping mechanism while means attached to said moving platform closes soil around said plug at a controlled depth partially covering a portion of said blade-like pieces;
    thereafter separating said blade-like pieces to release said plug; and
    thereupon withdrawing said blade-like pieces from the soil along a plane of narrowest cross section of said blade-like piece to minimize disturbance of soil about said plug.

2. A machine adapted to be moved in a direction horizontally over the ground for transplanting cylindrical plugs, each plug enclosing and protecting the root system of a seedling, said machine comprising:
    a machine frame;
    means attached to said frame for conveying gripping mechanisms around a loop, said conveying means including a horizontal path portion extending parallel to and adjacent the ground, said horizontal path portion extending parallel to the direction of machine movement for temporarily retaining gripping mechanisms on said horizontal path portion at selected locations relative to the ground at a substantially constant level at least partially below ground level;
    a plurality of gripping mechanisms attached to said conveying means at regulator positions, each gripping mechanism comprising a clip having first and second blade-like pieces, said blade-like pieces being disposed to abut to one another at a tip end along opposing faces, each said blade-like piece being disposed on said horizontal path portion of said conveying means to present its narrowest cross-section in a vertical plane parallel to the direction of machine movement, and to displace said tip ends only in a plane perpendicular to the direction of machine movement;

means for driving said conveying means to produce movement along said horizontal path portion at a speed relative to said machine in a range generally corresponding to ground speed when said machine is in motion over the ground, such that a gripping mechanism moving along said horizontal path portion is in the range of near zero velocity relative to the ground;

means for sequentially presenting said plugs for take-up by said gripping mechanisms in synchronization with said conveying means so that succeeding clips on said conveying means confront succeeding plugs;

means for sequentially opening each one of said clips by spreading said first and second blade-like pieces to displace said tip ends at a position immediately adjacent said take-up position;

means operative to cause said clip to close about each of said plugs at said take-up position;

means attached to said frame for opening a furrow in the ground ahead of each one of said gripping mechanisms when along its said horizontal path portion, said furrow opening means being operative to laterally divert soil of sufficient depth to accommodate a gripped plug;

means for thereafter closing soil into said furrow about all sides of said gripped plug;

means for releasing said gripped plug at a planting position after said furrow is closed; and means associated with said conveying means for withdrawing said clips through said soil of said furrow without displacing said released plug at said planting position.

3. A machine adapted to be moved in a direction horizontally over the ground for transplating cylindrical plugs, each plug enclosing and protecting the root system of a seedling, said machine comprising:

transport means for transporting said plugs;

means attached to said transport means for conveying gripping mechanisms around a loop, said conveying means including a horizontal path portion extending parallel to and adjacent the ground in a vertical plane along the direction of machine movement for temporarily retaining gripping mechanisms on said horizontal path portion at selected locations relative to the ground at a substantially constant level at least partially below ground level;

a plurality of gripping mechanisms attached to said conveying means at regular positions, each gripping mechanism comprising a clip having a first and a second blade-like piece, said blade-like pieces being disposed to abut to one another at a tip end along opposing faces, each said blade-like piece being disposed on said horizontal path portion of said conveying means to present its narrowest cross-section along said plane of said conveying means and to displace said tip ends only in a plane perpendicular to the plane of said conveying means;

means for driving said conveying means to produce movement along said horizontal path portion at a speed relative to said machine in a range generally corresponding to ground speed when said machine is in motion over the ground such that a gripping mechanism moving along said horizontal path portion is in the range of near zero velocity relative to the ground;

means for sequentially presenting said plugs in a position for take up by said gripping mechanisms in synchronization with said conveying means so that succeeding clips on said conveying means confront succeeding plugs;

means for sequentially opening each one of said clips by spreading said first and second blade-like pieces in a direction perpendicular to said plane of said conveying means at a position immediately adjacent said take-up position;

bias means operative to cause said clip to close about each of said plugs at said take-up position, said conveying means being inclined over a further portion of said conveying means path including said take-up position in a manner to cause said clip in a take-up position to be inclined relative to a central axis of a plug in a take-up position in order to compensate for inertial mass of said plug, which inertial mass causes said plug to angle downwardly in line with said clip as said plug is initially grasped but prior to said plug being fully gripped thereby to place said gripped plug in a position substantially perpendicular to said conveying means;

means attached to said transport means for opening a furrow in the ground ahead of each one of said gripping mechanisms when along said horizontal path portion, said furrow opening means being operative to laterally divert soil of sufficient depth to accommodate a gripped plug;

means for thereafter closing soil into said furrow about all sides of said gripped plug;

means for releasing said gripped plug at a planting position after said furrow is closed; and means for withdrawing said clips through said soil of said closed furrow without displacing said released plug at said planting position.

4. The invention of claim 3, and further including means for changing the direction of said conveying means at a point corresponding to the closing of said clip to move said gripped plug away from said plug take-up position to avoid jamming of said plug.

5. The invention of claim 3 and further comprising cleaning means associated with said releasing means for removing material that may be lodged between said opposed blade-like pieces as said clip moves past said cleaning means.

6. The invention of claim 3 wherein said conveying means comprises a loop of roller chain, and at least one stationary plate sized to permit longitudinal movement of said roller chain along an edge of said plate while constraining lateral motion thereof.

7. The invention of claim 3 wherein said conveying means and said driving means includes means for synchronizing movement of said conveying means at a speed such to provide a small forward component of ground speed to said gripped plug when moving along said horizontal path portion of said conveying means to compensate for forces exerted on the lower portion of said seedling plug during the closing of said furrow, said forces tending to tip said plug and to maintain said plug substantially upright.

8. The invention of claim 7 wherein said forward component of ground speed is approximately 5–15% of the ground speed of said machine.

9. A machine according to claim 3 further comprising bed shaping means for establishing a planting bed, said bed shaping means being mounted with respect to said transport means to establish the proper ground level to define the depth of said planting position.

10. The invention of claim 3 wherein said bed shaping means includes movable trailing tabs to adjustably regulate the closing of said furrow about said plug in said planting position.

11. The invention of claim 3 wherein said releasing means comprises wedge means disposed to be between and being operable to spread said blade-like pieces apart upon movement of said clip past said wedge means along said horizontal path portion.

12. The invention of claim 3 wherein said opening means comprises wedge means located at a position to open said clip in preparation for said clip's receiving a plug between said blade-like pieces.

* * * * *